(12) United States Patent
Lan et al.

(10) Patent No.: US 11,652,435 B2
(45) Date of Patent: May 16, 2023

(54) COMMAND GENERATION DEVICE AND COMMAND GENERATION METHOD

(71) Applicant: NIDEC CORPORATION, Kyoto (JP)

(72) Inventors: Linfeng Lan, Kyoto (JP); Tomohiro Fukumura, Kyoto (JP); Koichi Takae, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 482 days.

(21) Appl. No.: 16/962,831

(22) PCT Filed: Jan. 10, 2019

(86) PCT No.: PCT/JP2019/000425
§ 371 (c)(1),
(2) Date: Jul. 16, 2020

(87) PCT Pub. No.: WO2019/142712
PCT Pub. Date: Jul. 25, 2019

(65) Prior Publication Data
US 2021/0367547 A1 Nov. 25, 2021

(30) Foreign Application Priority Data
Jan. 17, 2018 (JP) .............................. JP2018-005657

(51) Int. Cl.
*H02P 7/298* (2016.01)
*H02P 29/00* (2016.01)
(52) U.S. Cl.
CPC ........ *H02P 29/0016* (2013.01); *H02P 7/2985* (2013.01)

(58) Field of Classification Search
CPC ... H02P 29/0016; H02P 7/2985; H02P 23/186
See application file for complete search history.

(56) References Cited

U.S. PATENT DOCUMENTS 5,819,202 A * 10/1998 Sato ................... G05B 19/4061
700/184
2017/0153614 A1 6/2017 Namie et al.
2017/0279388 A1* 9/2017 Matsushita ............. H02P 7/285

FOREIGN PATENT DOCUMENTS

JP H683433 A 3/1994
JP H96432 A 1/1997
(Continued)

OTHER PUBLICATIONS

International Search Report in PCT/JP2019/000425, dated Apr. 9, 2019. 4pp.

*Primary Examiner* — Muhammad S Islam
(74) *Attorney, Agent, or Firm* — Hauptman Ham, LLP

(57) ABSTRACT

A command generation device according to an exemplary embodiment of the present invention includes a command receiving unit that receives a high-level command value related to motion of a motor from a host device, and an internal target generation unit that generates an internal target value of the motor, including a position target value and a rotational speed target value, based on the high-level command value. The internal target generation unit includes a feedback calculator that generates the internal target value corrected based on a difference between the high-level command value and the internal target value, and generates the internal target value corrected in a cycle shorter than a cycle of receiving the high-level command value with the command receiving unit.

10 Claims, 4 Drawing Sheets

(56) References Cited

FOREIGN PATENT DOCUMENTS

| JP | H10228304 A | 8/1998 |
| JP | 2015156734 A | 8/2015 |
| JP | 2017102617 A | 6/2017 |

\* cited by examiner

COMMAND GENERATION DEVICE AND COMMAND GENERATION METHOD

CROSS-REFERENCE TO RELATED APPLICATIONS

This is the U.S. national stage of application No. PCT/JP2019/000425, filed on Jan. 10, 2019, and priority under 35 U.S.C. § 119(a) and 35 U.S.C. § 365(b) is claimed from Japanese Application No. 2018-005657, filed on Jan. 17, 2018.

FIELD OF THE INVENTION

The present invention relates to a command generation device and a command generation method that generate a command related to motion of a motor.

BACKGROUND

Conventionally, a motor control device controls rotation of a motor based on a position command and a rotational speed command from a host device.

There is a motor drive device that generates internal command information based on command information from a host device and causes a motor to follow the internal command information. Here, the motor drive device is configured to generate an internal position command on a trapezoidal speed pattern based on a position command of a pulse train command from the host device.

Unfortunately, the technique described above is limited to a method for generating an internal position command. The internal position command is generated with an open loop using the pulse train command from the host device, so that a degree of freedom of command generation is low and the command generation has insufficient accuracy.

SUMMARY

To solve the above problem, a command generation device according to an aspect of the present invention includes a command receiving unit that receives a high-level command value related to motion of a motor from a host device, and an internal target generation unit that generates an internal target value of the motor, including a position target value and a rotational speed target value, based on the high-level command value. The internal target generation unit includes a feedback calculator that generates an internal target value corrected based on a difference between the high-level command value and the internal target value, and generates the internal target value corrected in a cycle shorter than a cycle of receiving the high-level command value with the command receiving unit.

A command generation method according to an aspect of the present invention includes the steps of: receiving a high-level command value related to motion of a motor from a host device; and generating an internal target value of the motor, including a position target value and a rotational speed target value, based on the high-level command value. In the step of generating the internal target value, a feedback calculation for generating an internal target value corrected is performed based on a difference between the high-level command value and the internal target value, and the internal target value corrected is generated in a cycle shorter than a cycle of receiving the high-level command value.

A motor control device according to an aspect of the present invention includes the command generation device described above, and a motion control unit that performs position control and rotational speed control of the motor based on the internal target value generated by the command generation device.

In a motor unit according to an aspect of the present invention, the motor control device described above is mounted on a circuit board, and the circuit board supplies drive electric power to the motor.

The above and other elements, features, steps, characteristics and advantages of the present disclosure will become more apparent from the following detailed description of the preferred embodiments with reference to the attached drawings.

DETAILED DESCRIPTION

Hereinafter, embodiments of the present invention will be described with reference to the drawings.

The scope of the present invention is not limited to the embodiments described below, and can be arbitrarily changed within a range of technical ideas of the present invention.

Figure 1:
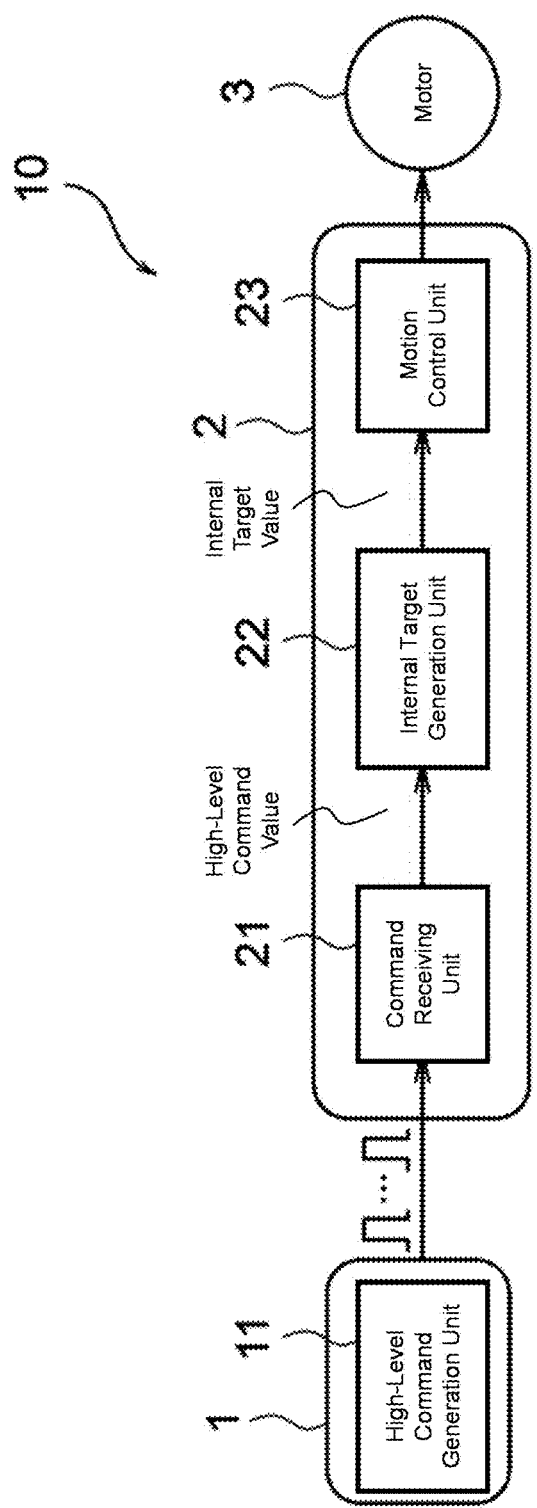
FIG. 1 is a diagram illustrating a configuration example of a motor drive system in the present embodiment.

FIG. 1 is a diagram illustrating a configuration example of a motor drive system 10 in the present embodiment.

The motor drive system 10 includes a host device 1, a motor control device 2, and a motor 3.

The host device 1 includes a high-level command generation unit 11 that generates a high-level command value related to motion of the motor, and transmits the high-level command value generated by the high-level command generation unit 11 to the motor control device 2. The host device 1 is driven by a clock independent of the motor control device 2.

The high-level command value includes information on at least one of the position command value and the rotational speed command value of the motor 3.

In the following description, a position command value as a high-level command value will be referred to as a "high-level position command value", and a rotational speed command value as a high-level command value will be referred to as a "high-level rotational speed command value".

In the present embodiment, a case where the high-level command value is a digital electric signal (pulse train command) will be described. The motor control device 2 can acquire the position command value from a pulse reception time of the pulse train command and the rotational speed command value from a pulse width of the pulse train command. That is, the high-level command value in the present embodiment includes both information about the position command value of the motor 3 and information about the rotational speed command value of the motor 3.

The motor control device 2 includes a command receiving unit 21, an internal target generation unit 22, and a motion control unit 23.

The command receiving unit 21 receives a high-level command value transmitted from the host device 1. In the present embodiment, the high-level command value is a pulse train signal, so that the command receiving unit 21 receives the information about the position command value and the information about the rotational speed command value from the host device 1 at predetermined time intervals. The command receiving unit 21 outputs the high-level command value received from the host device 1 to the internal target generation unit 22.

The internal target generation unit 22 generates an internal target value based on the high-level command value received by the command receiving unit 21, and outputs the generated internal target value to the motion control unit 23. Here, the internal target value includes the position target value and the rotational speed target value of the motor 3. In the following description, a position target value as an internal target value is referred to as an "internal position target value", and a rotational speed target value as an internal target value is referred to as an "internal rotational speed target value".

The motion control unit 23 performs position control and rotational speed control of the motor 3 based on the internal position target value and the internal rotational speed target value generated by the internal target generation unit 22.

In FIG. 1, the command receiving unit 21 and the internal target generation unit 22 correspond to the command generation device.

Figure 2:
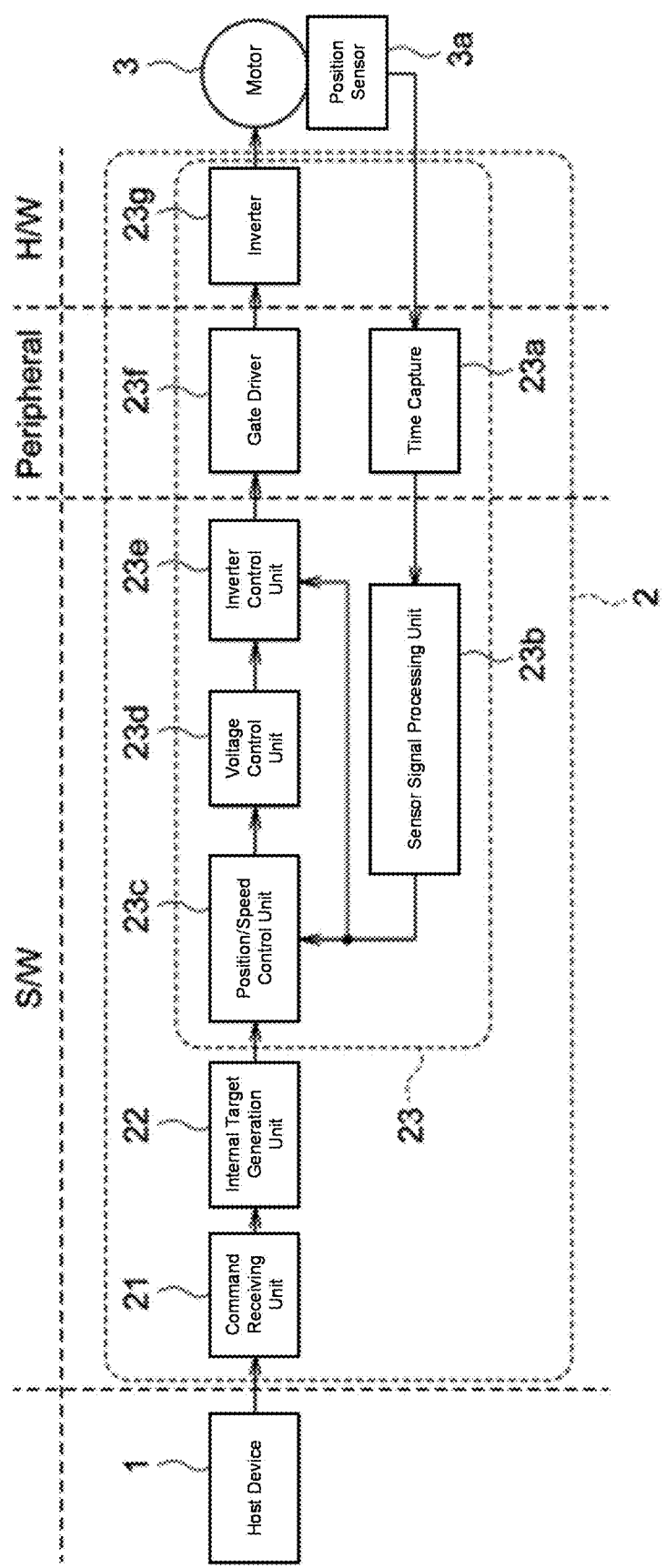
FIG. 2 is a diagram illustrating a specific configuration of a motor unit.

FIG. 2 is a diagram illustrating a specific configuration of a motor unit.

The motor unit includes the motor control device 2 and the motor 3. The motor control device 2 is mounted on a circuit board (not illustrated), and the circuit board supplies drive electric power to the motor 3.

As illustrated in FIG. 2, the motor 3 is provided with a position sensor 3a for detecting a motor rotation angle. Here, the position sensor 3a can be, for example, a magnetic sensor such as a Hall sensor. The position sensor 3a may be an optical sensor, a resolver, or the like.

An output signal of the position sensor 3a is acquired by a time capture 23a. A sensor signal processing unit 23b measures the motor rotation angle (motor actual position) and the motor rotational speed based on the output signal of the position sensor 3a acquired by the time capture 23a, and outputs a measurement result to a position/speed control unit 23c.

The position/speed control unit 23c generates a voltage command value based on the internal position target value and the internal rotational speed target value generated by the internal target generation unit 22, and the motor actual position and the motor rotational speed measured by the sensor signal processing unit 23b. A voltage control unit 23d calculates a duty ratio of a PWM signal based on the voltage command value generated by the position/speed control unit 23c. An inverter control unit 23e generates a PWM signal based on the duty ratio calculated by the voltage control unit 23d.

A gate driver 23f performs on/off control of a switching element constituting an inverter 23g based on the PWM signal generated by the inverter control unit 23e. The inverter 23g includes the above switching element, and supplies drive electric power to the motor 3 under the control of the gate driver 23f.

As illustrated in FIG. 2, units constituting the motor control device 2 include the command receiving unit 21, the internal target generation unit 22, the sensor signal processing unit 23b, the position/speed control unit 23c, the voltage control unit 23d, and the inverter control unit 23e, which can be configured by software (S/W). The inverter 23g can be configured by hardware (H/W).

Next, a specific configuration of the internal target generation unit 22 will be described.

Figure 3:
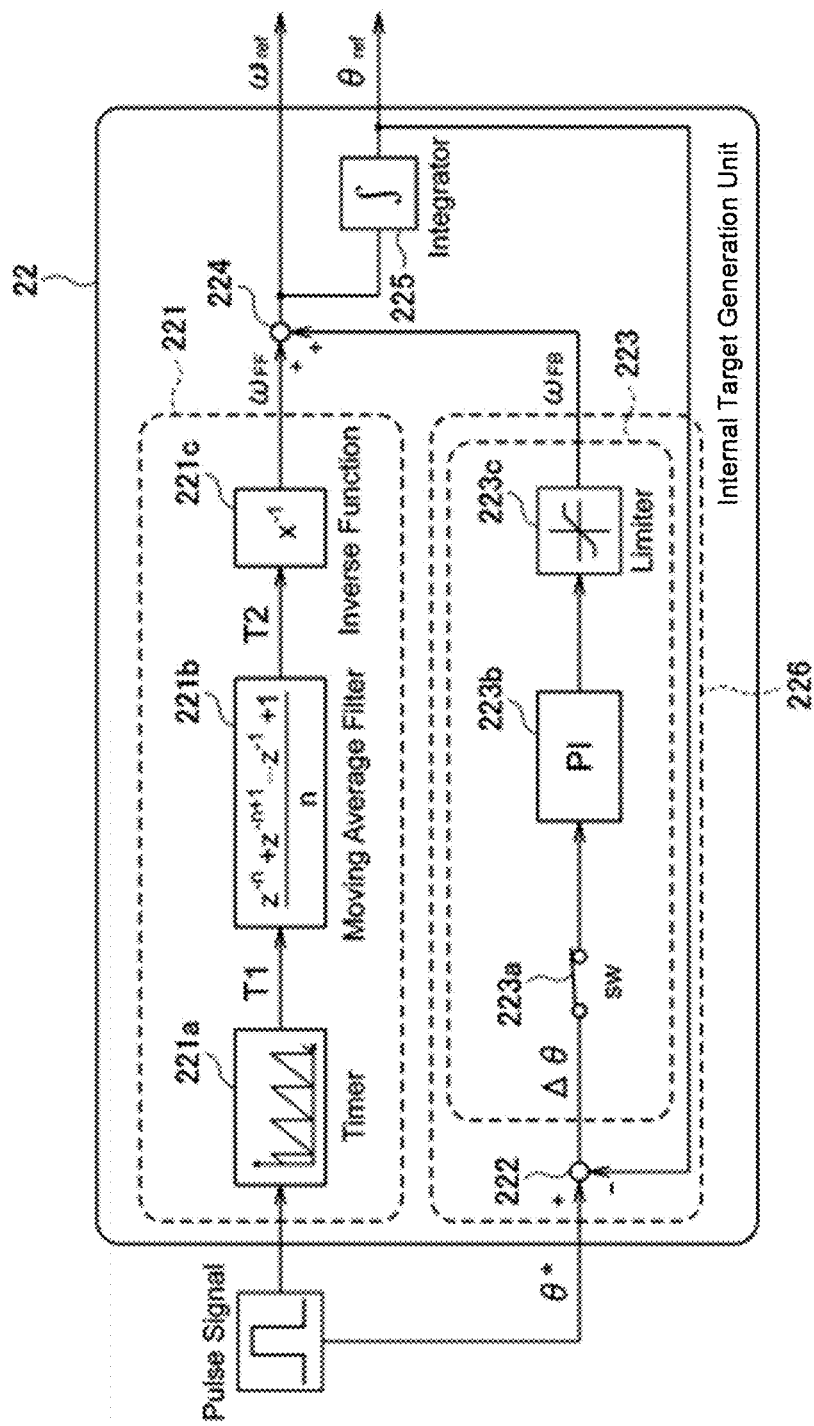
FIG. 3 is a diagram illustrating a specific configuration of an internal target generation unit.

FIG. 3 is a block diagram illustrating a specific configuration of the internal target generation unit 22. The internal target generation unit 22 includes a feedforward calculator 221, a difference calculator 222, a correction value generator 223, an adder 224, and an integrator 225. Here, the difference calculator 222 and the correction value generator 223 constitute a feedback calculator 226.

The feedforward calculator 221 receives a high-level command value from the above-mentioned command receiving unit 21, and generates a feedforward speed target value $\omega_{FF}$ using a predetermined model based on the high-level command value. The ford forward calculator 221 includes a pulse measurement section 221a, a moving average processor 221b, and an inverse calculator 221c.

The pulse measurement section 221a is a timer that records a counter value from a rising edge to the next rising edge of a pulse train signal being a high-level command value to measure a cycle T1. The moving average processor 221b includes a moving average filter, and calculates a cycle T2 that is a moving average value of the cycle T1. The inverse calculator 221c calculates the inverse of the cycle T2 using an inverse function model, and generates a calculation result as the feedforward speed target value $\omega_{FF}$.

As described above, the feedforward calculator 221 generates a feedforward speed target value $\omega_{FF}$ using a predetermined model (inverse function model) based on a result acquired by measuring a cycle of a pulse train command being a high-level command value with the timer and performing a moving averaging process on the cycle.

Although in the present embodiment, a case where the moving average processor 221b performs the moving average process will be described, smoothing means other than the moving average may be used. For example, a low pass filter or the like may be used as an example of the smoothing means.

The feedforward speed target value $\omega_{FF}$ generated by the feedforward calculator 221 is corrected by a correction value $\omega_{FB}$ generated by the feedback calculator 226, and is output as an internal rotational speed target value $\omega_{ref}$ that is an internal target value corrected. That is, the feedforward speed target value $\omega_{FF}$ can be called a reference value of the internal target value.

The feedback calculator 226 generates a correction value $\omega_{FB}$ for correcting the feedforward speed target value $\omega_{FF}$, which is the reference value of the internal target value, based on a difference between the high-level command value and the internal target value.

The difference calculator 222 calculates the difference between the high-level command value and the internal target value. Specifically, the difference calculator 222 calculates a difference $\Delta\theta$ between a high-level position command value $\theta^*$ and an internal position target value $\theta_{ref}$.

The correction value generator 223 generates a correction value for correcting the reference value based on the difference between the high-level command value and the internal target value, calculated by the difference calculator 222. Specifically, the correction value generator 223 generates a feedback speed target value $\omega_{FB}$ as a correction value for correcting the feedforward speed target value $\omega_{FF}$ based on the difference $\Delta\theta$ between the high-level position command value $\theta$ and the internal position target value $\theta_{ref}$.

The correction value generator 223 includes a switch 223a, a correction value calculator 223b, and a limiter 223c.

The switch 223a outputs the difference $\Delta\theta$ between the high-level position command value $\theta$ and the internal position target value $\theta_{ref}$ to the correction value calculator 223b, when turned on. The correction value calculator 223b calculates a correction value of the feedforward speed target value $\omega_{FF}$ for matching the internal position target value $\theta_{ref}$ with the high-level position command value $\theta^*$, based on the difference $\Delta\theta$. The limiter 223c sets an upper limit and a lower limit for the correction value calculated by the correction value calculator 223b, and outputs the feedback speed target value $\omega_{FB}$ that is a final correction value.

The adder 224 adds the feedback speed target value $\omega_{FB}$ generated by the feedback calculator 226 to the feedforward speed target value $\omega_{FF}$ generated by the feedforward calculator 221 to acquire the internal rotational speed target value $\omega_{ref}$ that is the internal target value corrected, and outputs the internal rotational speed target value $\omega_{ref}$.

The integrator 225 integrates the internal rotational speed target value $\omega_{ref}$ output from the adder 224 to generate the internal position target value $\theta_{ref}$. Here, the integrator 225 has a cycle of integration that is set to be shorter than a cycle in which the internal target generation unit 22 receives the high-level command value. That is, the internal target generation unit 22 generates the internal target value corrected in a cycle shorter than the cycle of receiving the high-level command value.

Figure 4:
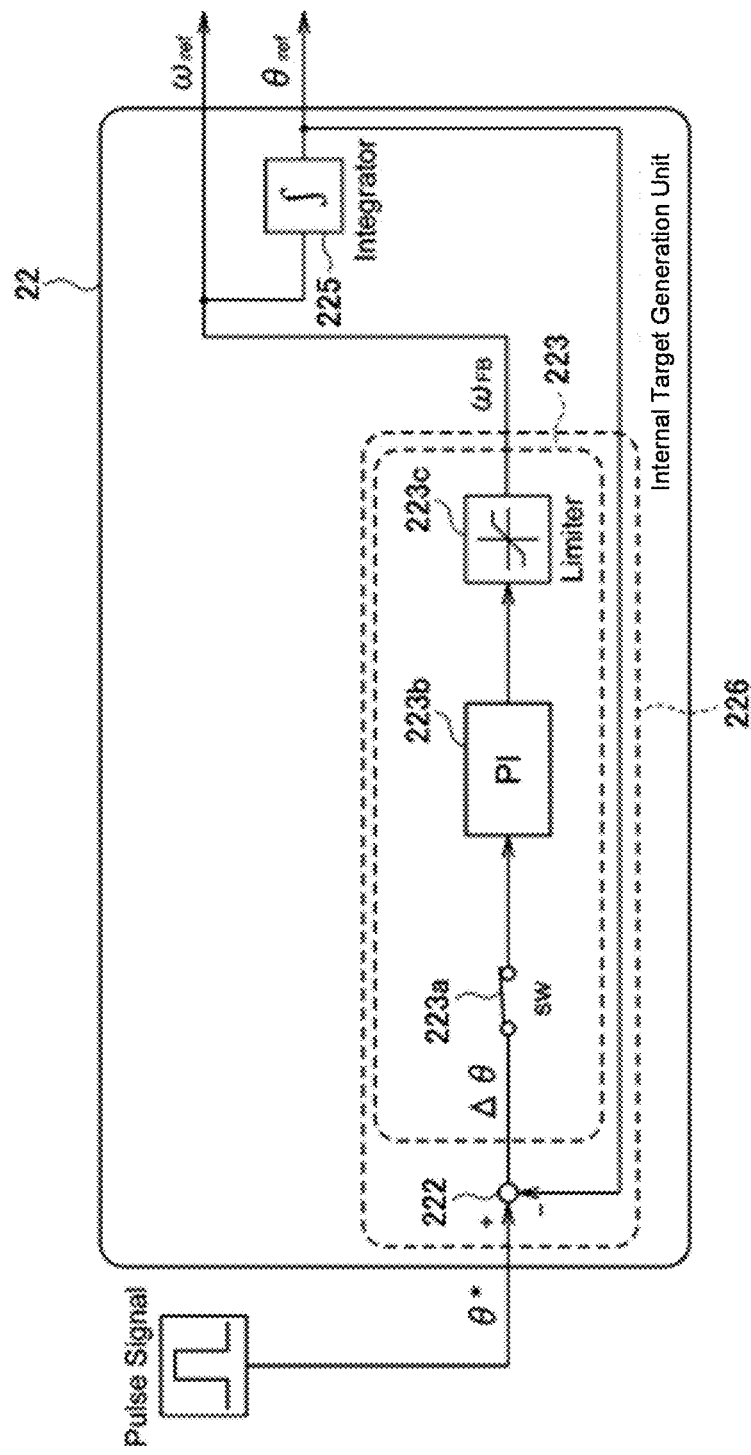
FIG. 4 is a diagram illustrating another configuration of the internal target generation unit.

FIG. 4 is a block diagram illustrating another configuration of the internal target generation unit 22.

The above-mentioned internal target generation unit 22 illustrated in FIG. 3 includes the feedforward calculator 221 and the feedback calculator 226, whereas the internal target generation unit 22 illustrated in FIG. 4 includes only the feedback calculator 226. More specifically, the internal target generation unit 22 illustrated in FIG. 4 does not include the feedforward calculator 221 and the adder 224, but includes the integrator 225 and the feedback calculator 226.

In this case, the feedback calculator 226 generates the internal target value corrected based on the difference between the high-level command value and the internal target value. That is, the feedback calculator 226 calculates the feedback speed target value $\omega_{FB}$ by using calculations such as proportion, differentiation, and integral based on the difference $\Delta\theta$ between the high-level position command value $\theta^*$ and the internal position target value $\theta_{ref}$, and outputs the feedback speed target value $\omega_{FB}$ as it is as the internal rotational speed target value $\omega_{ref}$ that is the internal target value corrected. As in FIG. 3, the internal target generation unit 22 generates the internal target value corrected in a cycle shorter than a cycle of receiving the high-level command value.

As described above, the motor control device 2 in the present embodiment includes a command generation device that generates the internal target value based on the high-level command value related to motion of the motor 3 from the host device 1. The motor control device 2 further includes the motion control unit 23 that performs position control and rotational speed control of the motor 3 based on the internal target value generated by the command generation device. When the motor control device 2 includes the command generation device and the motion control unit 23, position control or rotational speed control of the motor 3 incorporated in the host device 1 can be performed with high accuracy regardless of type of the host device 1.

Here, the command generation device includes a command receiving unit 21 and the internal target generation unit 22. The command receiving unit 21 receives a high-level command value related to the motion of the motor 3 from the host device 1. The internal target generation unit 22 generates the internal target value including the position target value and the rotational speed target value of the motor 3 based on the high-level command value received by the command receiving unit 21.

As illustrated in FIG. 4, the internal target generation unit 22 can include the feedback calculator 226 that generates an internal target value corrected based on the difference between the high-level command value and the internal target value. At this time, the internal target generation unit 22 generates the internal target value corrected in a cycle shorter than the cycle of receiving the high-level command value.

In this way, the internal target generation unit 22 includes the feedback calculator 226, and the internal target value generated based on the high-level command value is further corrected by a feedback calculation. This enables generating a command value that enables highly accurate synchronous operation of a motor. The internal target generation unit 22 generates the internal target value in a cycle shorter than the cycle of receiving the high-level command value, so that a command value can be more accurately generated to enable the motor 3 to be smoothly controlled. The internal target generation unit 22 further can generate both the position target value and the rotational speed target value with high accuracy as the internal target value. This enables the motion control unit 23 to accurately perform both the position control and the rotational speed control of the motor 3, thereby enabling highly accurate synchronous operation of the motor 3.

When a signal of the high-level command value is disturbed due to noise superposition or the like, the motion of the motor 3 cannot be controlled with high accuracy. In contrast, in the present embodiment, an internal target value corrected is generated by feedback calculation based on the difference between the high-level command value and the internal target value, and the motor 3 is controlled based on the internal target value corrected. This enables reducing influence of the above-mentioned signal disturbance to control the motor 3 with high accuracy.

In the present embodiment, the high-level command value is indicated by a pulse train signal. For example, there is a method using a serial communication method to achieve synchronization of independent microprocessors. That case requires dedicated hardware for communication is required, thereby leading to a cost increase. In the present embodiment, a pulse train signal is used as the high-level command value, so that the above-mentioned dedicated hardware with high cost is unnecessary, and thus the cost can be reduced accordingly. Using the pulse train signal as the high-level command value enables a position command value and a rotational speed command value included in the high-level command value to be easily acquired by detecting a rising edge or a falling edge of the pulse train signal, so that the internal target value can be generated appropriately.

As illustrated in FIG. 3, the internal target generation unit 22 can include the feedforward calculator 221, the feedback calculator 226, and the adder 224. The feedforward calculator generates a reference value of the internal target value using a predetermined model based on the high-level command value. The feedback calculator generates a correction value for correcting the reference value generated by the feedforward calculator 221 based on the difference between the high-level command value and the internal target value. The adder adds the correction value to the reference value to generate an internal target value corrected.

Here, the feedback calculator 226 includes the difference calculator 222 that calculates a difference between the high-level command value and the internal target value, and the correction value generator 223 that generates a correction value for correcting the reference value based on the difference. In this way, the internal target generation unit 22 corrects the target value predicted by the feedforward calculation using the feedback calculation to generate the internal target value corrected.

The target value predicted by the feedforward calculation may contain some error, and this error has a considerable adverse effect on accuracy of motor control. In the present embodiment, the target value predicted by the feedforward calculation is corrected by the feedback calculation, so that the above error contained in the target value predicted by the feedforward calculation can be corrected appropriately. As a result, the internal target value used for motor control can be generated with high accuracy.

Additionally, the feedforward calculator 221 generates a reference value of the internal rotational speed target value $\omega_{ref}$, and the feedback calculator 226 generates a correction value for correcting the reference value of the internal rotational speed target value $\omega_{ref}$ based on the difference between the high-level position command value $\theta^*$ and the internal position target value $\theta_{ref}$.

As described above, when the feedforward calculator 221 generates the reference value of the rotational speed target value, the feedback calculator 226 generates a correction value for correcting the reference value of the rotational speed target value based on the difference between the position command value and the position target value. In this way, the reference value of any one of the position target value and the rotational speed target value is corrected by the correction value generated based on the difference in the other. Thus, the target value predicted by the feedforward calculation can be appropriately corrected, and the internal target value can be generated with high accuracy.

The feedforward calculator 221 further acquires the cycle T1 of the pulse train signal with the timer, and generates the feedforward speed target value $\omega_{FF}$, which is a reference value of the internal rotational speed target value $\omega_{ref}$, using a predetermined model based on the acquired cycle T1 of the pulse train signal. At this time, the feedforward calculator 221 can generate the reference value smoothed. This enables the feedforward calculator 221 to reduce a signal variation of the high-level command value and appropriately generate the feedforward speed target value $\omega_{FF}$.

As described above, the command generation method in the command generation device according to the present embodiment includes the steps of: receiving a high-level command value related to motion of a motor from a host device; and generating an internal target value including a position target value and a rotational speed target value of the motor based on the high-level command value. In the step of generating the internal target value, a feedback calculation for generating an internal target value corrected is performed based on a difference between the high-level command value and the internal target value, and the internal target value corrected is generated in a cycle shorter than a cycle of receiving the high-level command value. In the step of generating the internal target value, the internal target value corrected also can be generated in a cycle shorter than the cycle of receiving the high-level command value by performing a feedforward calculation for generating a reference value of the internal target value using a predetermined model based on the high-level command value, a feedback calculation for generating a correction value for correcting the reference value based on a difference between the high-level command value and the internal target value, and a calculation for generating an internal target value corrected by adding the correction value to the reference value.

This enables generating an internal target value that enables synchronous operation in which the motor 3 is at a predetermined position at a predetermined time based on a high-level command value transmitted from the host device 1 driven by a clock independent of the motor control device 2, the synchronous operation being achievable at low cost with high efficiency and high accuracy. Thus, motor synchronous rotation with high accuracy in response to the high-level command value can be achieved.

The motor drive system 10 of the present embodiment is suitable for a system in which position control and rotational speed control of a motor are strictly required. Examples of such a system include a system for driving and controlling a motor used in OA equipment, a laser radar, a fan, or the like.

In the above embodiment, the case where the feedback calculator 226 generates the feedback speed target value $\omega_{FB}$ based on the difference $\Delta\theta$ between the high-level position command value $\theta$ and the internal position target value $\theta_{ref}$ has been described. However, the feedback calculator 226 is not limited to the configuration of feeding back a position target value, and may be configured to feed back a rotational speed target value.

That is, the internal target generation unit 22 illustrated in FIG. 3 may be configured such that the feedforward calculator 221 generates a reference value of the internal position target value $\theta_{ref}$, and the feedback calculator 226 generates a correction value for correcting the reference value based on a difference between a high-level rotational speed command value and an internal rotational speed target value (pref. Even in this case, the same effect as that of the above-described embodiment can be obtained.

In this way, the feedforward calculator 221 generates the reference value of the internal target value of any one of the position target value and the rotational speed target value, and the feedback calculator 226 generates a correction value for correcting the reference value based on a difference between the high-level command value and the internal target value in the other of the position target value and the rotational speed target value.

Although in the above embodiment, the case where the high-level command value is a pulse train signal has been described, the high-level command value may include information about at least one of the position command value and the rotational speed command value of the motor 3, and thus is not limited to the pulse train signal. For example, even when the high-level command value includes only information about any one of the position command value and the rotational speed command value, information about the other of the position command value and the rotational speed command value can be generated using a predetermined model. Thus, both the position target value and the rotational speed target value can be appropriately generated as the internal target value.

The internal target generation unit 22 illustrated in FIG. 3 may be switched to a configuration in which only the feedforward calculator functions by turning off the switch 223a to turn off a feedback calculation according to an estimated state of each command value.

Although in the above-mentioned embodiment, the case where the feedback calculator 226 feeds back the internal target value has been described, the feedback calculator 226 may be switched to a configuration in which an actual motor position is fed back according to a method for controlling the motor 3. When the actual motor position is fed back, the switch 223a may be turned on or off to turn on or off the feedback calculation according to a state of the motor. For example, the switch 223a may be turned on when the motor is in a favorable rotation state, and the switch 223a may be turned off when the motor is in an unfavorable rotation state causing variations in the actual motor position.

Additionally, although in the above embodiment, the case where the motor control device 2 includes the command generation device has been described, the host device 1 may include the command generation device. However, when the motor control device 2 including the motion control unit 24 includes the command generation device, a command value generated by the command generation device can be used for motor control with high accuracy, and thus motion of the motor can be controlled with high accuracy.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A command generation device comprising:
a command receiving unit that receives a high-level command value related to motion of a motor from a host device; and
an internal target generation unit that generates an internal target value of the motor, including a position target value and a rotational speed target value, based on the high-level command value,
the internal target generation unit including a feedback calculator that generates the internal target value corrected based on a difference between the high-level command value and the internal target value, and
the internal target generation unit generating the internal target value corrected in a cycle shorter than a cycle of receiving the high-level command value with the command receiving unit.

2. The command generation device according to claim 1, wherein
the high-level command value includes information about at least one of the position target value and the rotational speed target value of the motor.

3. The command generation device according to claim 1, wherein
the high-level command value is a pulse train signal.

4. A motor control device comprising:
the command generation device according to claim 1; and
a motion control unit that performs position control and rotational speed control of the motor based on the internal target value generated by the command generation device.

5. A motor unit comprising:
the motor control device according to claim 4 mounted on a circuit board,
the circuit board supplying drive electric power to the motor.

6. A command generation device comprising:
a command receiving unit that receives a high-level command value related to motion of a motor from a host device; and
an internal target generation unit that generates an internal target value of the motor,
including a position target value and a rotational speed target value, based on the high-level command value,
the internal target generation unit including:
a feedforward calculator that generates a reference value of the internal target value using a predetermined model based on the high-level command value;
a feedback calculator that generates a correction value for correcting the reference value based on a difference between the high-level command value and the internal target value; and
an adder that generates the internal target value corrected by adding the correction value to the reference value,
the internal target generation unit generating the internal target value corrected in a cycle shorter than a cycle of receiving the high-level command value with the command receiving unit.

7. The command generation device according to claim 6, wherein
the feedforward calculator generates the reference value of any one of the position target value and the rotational speed target value, and
the feedback calculator generates the correction value for correcting the reference value of the one based on the difference in the other of the position target value and the rotational speed target value.

8. The command generation device according to claim 6, wherein
the feedforward calculator generates the reference value smoothed.

9. The command generation device according to claim 7, wherein
the high-level command value is a pulse train signal, and
the feedforward calculator generates the reference value of any one of the position target value and the rotational speed target value using the predetermined model based on a cycle of the pulse train signal.

10. A command generation method comprising the steps of:
receiving a high-level command value related to motion of a motor from a host device; and
generating an internal target value of the motor, including a position target value and a rotational speed target value, based on the high-level command value,
wherein in the step of generating the internal target value,
a feedback calculation for generating the internal target value corrected is performed based on a difference between the high-level command value and the internal target value, and
the internal target value corrected is generated in a cycle shorter than a cycle of receiving the high-level command value.

* * * * *